United States Patent Office 2,819,292
Patented Jan. 7, 1958

---

2,819,292

ALLYL-N-ALLYLCARBAMATE; N-ALLYLCARBAMATES

Richard P. Welcher and Donald W. Kaiser, Old Greenwich, Conn., assignors to American Cyanamid Company, New York, N. Y., a corporation of Maine No Drawing. Application January 5, 1954
Serial No. 402,408

7 Claims. (Cl. 260—468)

This invention relates to a new and improved method of preparing N-substituted carbamates. More particularly it is concerned with a method of preparing N-substituted carbamates using readily available starting materials having a certain molecular structure.

In his copending application Serial No. 357,928, filed May 27, 1953, now U. S. Patent No. 2,697,720, by Donald W. Kaiser, one of the inventors herein, has disclosed and claimed the compound allyl-N-allylcarbamate. Therein one method for the preparation of the compound is disclosed. The preparation as disclosed therein proceeds by the reaction of potassium cyanate with allyl chloride and allyl alcohol in the presence of acetonitrile. The reaction is carried out at elevated temperatures and pressures.

The present invention contemplates different starting materials and different conditions of reaction in order to produce N-substituted carbamates, allyl N-allyl-carbamate being but one of the carbamates so produced. To this end the starting material in the present reaction comprises an iminocarbonate containing a certain carbon group adjacent to at least one oxygen atom. The iminocarbonate is heated to a temperature in the range of about 180°–500° C. The heat causes the iminocarbonate to rearrange into an N-substituted carbamate. The N-substituted carbamate thereby produced is then isolated from the resulting reaction mass.

The iminocarbonate which comprises the starting material of the present invention may be readily prepared by the following general reaction in which an alcohol is reacted with cyanogen chloride in the presence of a basic acceptor such as sodium hydroxide:

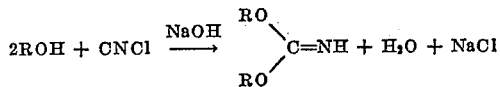

The alcohols for the above reaction are readily available.

It is generally advisable to prepare the iminocarbonate as needed. On storage these iminocarbonates gradually deteriorate to form the corresponding cyanurate ester and the alcohol.

The iminocarbonate must contain at least one radical which contains the carbon group:

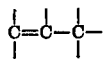

This radical must be attached to at least one oxygen atom in the iminocarbonate. It will be recognized that the above carbon group is the basic structure found in the allyl radical. However, this same carbon group also occurs in the 1-cyclohexenylmethyl radical.

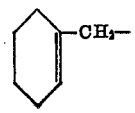

and in the $\Delta^2$-cyclohexenyl radical

The free valences in the above carbon group may be attached to hydrogen or alkyl radicals, as for example, methyl, ethyl, propyl, isopropyl, butyl, amyl, isoamyl, hexyl, heptyl, octyl, nonyl, decyl, and others; they may be attached to alkenyl radicals, for example, allyl, crotyl, ethallyl, pentenyl, hexenyl, heptenyl, octenyl, and others; they may be attached to aralkyl radicals such as benzyl, phenylethyl, and others; they may be attached to aralkenyl radicals such as alpha-phenyl-allyl.

The heating of the iminocarbonate necessary to cause the rearrangement to the N-substituted carbamate should be done rapidly and maintained for a short period of time. This may be done by passing the iminocarbonate dropwise down a hot tube. The reaction mass may be collected in a vessel at the bottom of the hot tube. As an alternative method, a film of the iminocarbonate may be deposited on a heated spinning plate or on a vertical column. The product may be collected as it is flung off the periphery of the wheel or as it collects at the bottom of the column. On fractionation the N-substituted carbamate may be recovered from the collected reaction mass.

The residence time in the hot tube or on a spinning plate should generally be in the range of about 0.1–15 seconds. It is generally preferred to maintain a residence time of about 0.5 second. Increased residence time beyond about 15 seconds may result in excessive polymerization or decomposition of the product, particularly if an N-allylcarbamate is being made, and hence should be avoided if optimum yields are sought. Should accurate control of the residence time be desired when the hot tube method is used, an inert diluent such as an inert hydrocarbon may be mixed with the iminocarbonate before or during heating.

The rearrangement is carried out at a temperature in the range of about 180°–500° C. Generally if the higher temperatures are used then the residence time should be shorter. For instance, if a temperature of about 500° C. is to be used, residence time should be on the order of about 0.1 seconds, particularly if an N-allylcarbamate is being made. If, however, the temperature to be used is 180° C., the residence time may be appreciably longer. The preferred temperature range is 380°–420° C. since at this temperature range a residence time of about 0.5 second suffices to cause the rearrangement using a hot tube of convenient size. A temperature of 400° C. and a residence time of 0.5 second are readily obtained in the laboratory and plant. In any case, recycling the reaction mass may occasionally be desirable.

The reaction of the present invention may be illustrated by the following equation:

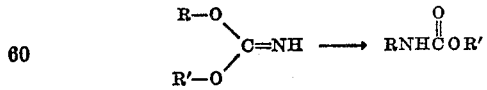

where R contains the carbon group described earlier. R' can be the same as R, or it can be any other radical.

The structure of the N-substituted carbamate product will depend on the structure of the iminocarbonate used. Thus diallyl iminocarbonate produces allyl N-allylcarbamate. Di-2-methallyl iminocarbonate produces 2-methallyl N-2-methallyl carbamate. O-methyl, O'-allyl iminocarbonate produces methyl N-allylcarbamate. Di-3-methallyl iminocarbonate produces 3-methallyl N-1-methallyl-carbamate. These compounds are useful as comonomers with such things as styrene to form useful resins. These compounds can also be hydrolyzed to obtain the amines which would be expensive to produce by some other method.

In order that those skilled in the art may better understand how the present invention can be carried into effect, the following examples are given by way of illustration and not by way of limitation.

*Example 1*

A glass tube 18 inches long, 1 inch in diameter, wound with resistance wire and fitted with a thermocouple, dropping funnel, gas inlet, and a receiver at the bottom was heated to 400° C. and flushed with nitrogen gas. Diallyl iminocarbonate (84 parts) was added dropwise over a period of 2.1 hours. On fractionation the reaction mass (82 parts) yielded allyl N-allylcarbamate (68 parts), B. P. 77–80° C./mm., $n_D^{25}=1.4583$, corresponding to 81% overall yield. Its identity was confirmed by its infrared spectrum. Other products were allyl alcohol and resin.

*Example 2*

A total of 40 parts di-2-methallyl iminocarbonate were dropped through the glass tube described in Example 1 over a period of 1 hour. The temperature was 380° C. The reaction mass (38 parts) on fractionation gave 35 parts of 2-methallyl N-2-methallyl-carbamate corresponding to an overall yield of 85%.

*Example 3*

100 parts of di-3-methallyl iminocarbonate were dropped through the hot tube of Example 1 over a period of 2.5 hours. The temperature was 400° C. The reaction mass (87 parts) was fractionated. This yielded 78 parts of 3-methallyl N-1-methallyl carbamate, an overall yield of 78%.

*Example 4*

87 parts of di ($\Delta^2$-cyclohexenyl) iminocarbonate were dropped through the hot tube of Example 1 over a period of 6 hours. The temperature was about 180° C. The reaction mass of 78 parts was fractionated to give 34 parts of $\Delta^2$-cyclohexenyl N-$\Delta^2$-cyclohexenyl carbamate, a yield of 39%.

*Example 5*

42 parts of di(1-cyclohexenylmethyl) iminocarbonate were dropped through the hot tube of Example 1 over a period of 0.5 hour. The temperature was 500° C. The reaction mass of 39 parts was fractionated to give 37.5 parts of 1-cyclohexenylmethyl N-2-methyl-$\Delta^2$-cyclohexenyl carbamate.

We claim:

1. The method of preparing an N-substituted carbamate ester which comprises heating an iminocarbonate containing two like carbon groups having the formula

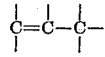

each group being adjacent to at least one oxygen atom to a temperature in the range of about 180°–500° C., and recovering N-substituted carbamate ester thereby produced from the reaction mass.

2. The method of preparing an N-allylcarbamate ester which comprises heating a diallyl iminocarbonate to a temperature in the range of about 180°–500° C., and recovering N-allylcarbamate ester thereby produced from the reaction mass.

3. The method according to claim 2 wherein said heating is carried out at a temperature range of about 380°–420° C.

4. The method according to claim 3 wherein said heating is carried out at about 400° C.

5. The method for preparing allyl N-allylcarbamate which comprises heating di-allyl iminocarbonate to a temperature of about 400° C. for a period of about 0.5 second, and recovering allyl N-allylcarbamate thereby produced from the reaction mass.

6. The method of preparing 1-cyclohexenylmethyl N-2-methyl-$\Delta^2$-cyclohexenyl carbamate which comprises heating di(1-cyclohexenylmethyl) iminocarbonate to a temperature of about 500° C., and recovering 1-cyclohexenylmethyl N-2-methyl-$\Delta^2$-cyclohexenyl carbamate from the reaction mass.

7. The method of preparing $\Delta^2$-cyclohexenyl N-$\Delta^2$-cyclohexenyl carbamate which comprises heating di($\Delta^2$-cyclohexenyl) iminocarbonate to a temperature of about 180° C., and recovering $\Delta^2$-cyclohexenyl N-$\Delta^2$-cyclohexenyl carbamate from the reaction mass.

References Cited in the file of this patent

UNITED STATES PATENTS

| | | |
|---|---|---|
| 2,598,664 | Kropa | June 3, 1952 |
| 2,697,720 | Kaiser | Dec. 21, 1954 |

OTHER REFERENCES

Chapman: Chem. Abs. 20, 181 (1926).